US012650410B2

(12) United States Patent
deWalle et al.

(10) Patent No.: US 12,650,410 B2
(45) Date of Patent: Jun. 9, 2026

(54) SYSTEMS AND METHODS FOR NON-DESTRUCTIVE PARTS TESTING

(71) Applicants: Richard T. deWalle, Brampton (CA); Jeffrey G. deWalle, Toronto (CA); Brian S. deWalle, Burlington (CA)

(72) Inventors: Richard T. deWalle, Brampton (CA); Jeffrey G. deWalle, Toronto (CA); Brian S. deWalle, Burlington (CA)

( * ) Notice: Subject to any disclaimer, the term of this patent is extended or adjusted under 35 U.S.C. 154(b) by 0 days.

(21) Appl. No.: 15/240,605

(22) Filed: Aug. 18, 2016

(65) Prior Publication Data

US 2017/0052151 A1     Feb. 23, 2017

(30) Foreign Application Priority Data

Aug. 21, 2015    (CA) ................................. CA 2901494

(51) Int. Cl.
*G01N 29/30*          (2006.01)
*G01N 29/04*          (2006.01)
(Continued)

(52) U.S. Cl.
CPC ........... *G01N 29/30* (2013.01); *G01N 29/043* (2013.01); *G01N 29/28* (2013.01); *G01N 29/4427* (2013.01); *G01N 29/4436* (2013.01); *G01N 2291/044* (2013.01); *G01N 2291/105* (2013.01); *G01N 2291/2691* (2013.01); *G01N 2291/2694* (2013.01)

(58) Field of Classification Search
CPC ............................... G01N 29/28; G01N 29/30
See application file for complete search history.

(56) References Cited

U.S. PATENT DOCUMENTS 3,759,090 A *  9/1973  McFaul ................... G01L 5/246
                                                              73/597
3,822,587 A *  7/1974  Makino ................... B25B 23/14
                                                              73/581
(Continued)

FOREIGN PATENT DOCUMENTS

EP          3187870 B1    10/2025

OTHER PUBLICATIONS

Technical Spotlight: Eddy Current Testing Higher Throughput, Smaller Flaw Detection, Greater Precision, and More Cost-Efficient NDT. ASM International, Apr. 1, 2013, www.asminternational.org/c/portal/pdf/download?articleId=AMP17104P25&groupId=10192.*

*Primary Examiner* — Alexander A Mercado
(74) *Attorney, Agent, or Firm* — Phillips Lytle LLP; David L. Principe

(57)          ABSTRACT

There is disclosed herein systems and methods for non-destructive testing of test bodies. The method includes positioning the test body in a test position, transmitting ultrasonic waves, by a transmission device, into the test body at one or more locations on the surface of one end of the test body; receiving portions of the ultrasonic waves, by a receiving device, that are reflected from or through the test body at each of the locations on the surface of one end of the test body; generating, by a wave generating device, at least one test wave form based on the portions corresponding to each of the locations on the surface of one end of the test body; comparing, by a wave processing device, the test wave form for the body at each of the locations to a respective one of a set of calibration wave forms for a reference body.

10 Claims, 3 Drawing Sheets

(51) Int. Cl.

| | |
|---|---|
| *G01N 29/28* | (2006.01) |
| *G01N 29/44* | (2006.01) |

(56) References Cited

U.S. PATENT DOCUMENTS

| | | | | | |
|---|---|---|---|---|---|
| 4,014,208 | A | * | 3/1977 | Moore | G01L 5/246 |
| | | | | | 73/610 |
| 4,333,351 | A | * | 6/1982 | Bickford | G01L 5/24 |
| | | | | | 411/14 |
| 4,413,518 | A | * | 11/1983 | Jones | G01B 17/04 |
| | | | | | 367/108 |
| 4,846,001 | A | * | 7/1989 | Kibblewhite | B25B 23/1425 |
| | | | | | 310/322 |
| 5,156,050 | A | * | 10/1992 | Schmid | B06B 1/0681 |
| | | | | | 73/628 |
| 5,970,798 | A | * | 10/1999 | Gleman | G01L 5/246 |
| | | | | | 73/761 |
| 6,009,759 | A | * | 1/2000 | Kibblewhite | F16B 31/02 |
| | | | | | 73/597 |
| 8,810,370 | B2 | * | 8/2014 | Tillotson | H04Q 9/00 |
| | | | | | 340/10.1 |
| 9,063,069 | B2 | * | 6/2015 | Stickel | G01L 5/246 |
| 9,429,546 | B2 | * | 8/2016 | Williams | G01N 29/24 |
| 2003/0033878 | A1 | * | 2/2003 | Dubois | G01N 29/0645 |
| | | | | | 73/600 |
| 2003/0135285 | A1 | * | 7/2003 | Osterkamp | G05B 11/01 |
| | | | | | 700/11 |
| 2004/0244491 | A1 | * | 12/2004 | Vyas | G01N 29/11 |
| | | | | | 73/627 |
| 2005/0208452 | A1 | * | 9/2005 | Lang | A61C 8/0089 |
| | | | | | 433/173 |
| 2005/0279171 | A1 | * | 12/2005 | Kollgaard | G01N 29/0645 |
| | | | | | 73/627 |
| 2009/0249879 | A1 | * | 10/2009 | Jeyaraman | G01N 29/0645 |
| | | | | | 73/644 |
| 2014/0260628 | A1 | * | 9/2014 | Devlin | G01N 29/043 |
| | | | | | 73/620 |
| 2016/0069838 | A1 | * | 3/2016 | Bueno | G01N 29/043 |
| 2017/0023425 | A1 | * | 1/2017 | Kibblewhite | G01L 5/246 |

* cited by examiner

<u>100</u>

Positioning the test body in a test position, wherein the test body has at least one surface
<u>102</u>

Transmitting ultrasonic waves, by a transmission device, into the test body at one or more locations on the surface of one end of the test body
<u>104</u>

Receiving portions of the ultrasonic waves, by a receiving device, that are reflected from or through each of the locations of one end of the test body
<u>106</u>

Generating by a wave device, at least one test wave form based on the portions corresponding to each of the locations of one end of the test body
<u>108</u>

Comparing, by a wave processing device, the test wave form for the body at each of the locations of one end of the test body to a respective one of a set of calibration wave forms for a reference body
<u>110</u>

Recording on a storage device, a result from the comparing
<u>112</u>

Outputting the result by an output device
<u>114</u>

<u>FIG. 2</u>

SYSTEMS AND METHODS FOR NON-DESTRUCTIVE PARTS TESTING

TECHNICAL FIELD

The subject matter disclosed herein relates to methods and systems for the Non-Destructive Testing ("NDT) of objects by means of Ultrasound-based processes. These methods and systems include, more particularly, improved testing systems and methods of providing and setting up testing systems, including control units for overseeing such systems, accumulating, and processing related data.

BACKGROUND

Various methods for the NDT of test objects using ultrasound are known. Generally speaking, an ultrasonic pulse generated by an ultrasonic transducer in the transmit mode is insonified into a test object so that it propagates therein. If the pulse hits a flaw in the test object, for example a discontinuity, the pulse is reflected at least partially, and detected by means of the same ultrasonic transducer in the receive mode. In some known systems, two transducers, an array, or a phased array of transducers may be used.

Positions of any discontinuities (e.g., cracks, materials imperfections) in the test object can be deduced from the travel time of the pulse into the test object and the arrival of the reflected pulse at the receiver. In addition, the amplitude of the reflected pulse can be used to determine the magnitude of the discontinuity.

In order to assess the significance of any discontinuities, cracks or other deficiencies in the tested part, it is known in the art to employ calibration test objects. These have discontinuities of a known size(s) and location(s). Testing of these objects provides a benchmark by which to measure any later monitored discontinuities in the general sample of test bodies. It is necessary in certain applications to test the integrity of metal work pieces, with respect to, among other variables, surface integrity and sub-surface integrity. Cracks, notches or holes in the surface and the sub-surface can result in weakened parts and heightening risks of failure.

Turning back to the calibration test object, it will generally correspond in geometry and material properties to the test object. The resulting dependency on distance of the echo amplitudes is experimentally determined by means of the known discontinuities (e.g. reference notches) present in the reference body, and is typically transferred onto a display component of the test system (e.g., a screen on which an operator may view a wave for an image). The test object may then be scanned to see if any recordable indication is given in view of an echo reaching or exceeding the magnitude of the reference. As noted above, visual representations of the waveform will be provided, with reference values or other indicia provided to enable the operator to discern the extent to which the flaw indication may exceed the predetermined allowable level.

Testing of the general nature discussed above is common in, for example, the aircraft parts industry. Other industries require similarly stringent testing of parts (e.g., bolts), for use in high pressure environments in which failure can have extreme consequences. These include, for example, components of nuclear facilities and the like.

In the referenced aircraft industry applications, parts undergo extreme stresses, and loss of integrity or failure of such a part can cause correspondingly catastrophic failures in respect of the aircraft in which this part is used. While redundancies exist, aimed at avoiding such catastrophic failure; that is, the failure of a single bolt among those holding two wheel halves together will not typically result in detachment of the two wheel halves, but instead causes a loss of strength required to hold those two wheel halves together. There is, however, the potential of eventual wheel failure.

Given the importance of structural integrity of parts employed in the aircraft industry, persons conducting the examination of any of such part must rigorously follow very specific procedures. Industry standard qualifications exist for the purpose of accrediting and certifying persons with various levels of expertise vis-à-vis testing, as well as the setup and monitoring of related testing systems, and accepting or rejecting the tested part in response to test results.

As a consequence of the stringent safety requirements and the procedures for receiving accreditation, more highly accredited individuals are relatively rare and can command higher remuneration. These more highly accredited individuals may themselves conduct the mass testing of parts (typically conducted one part at a time). More commonly, such persons are responsible for the setup and calibration of testing systems, as well as the preliminary supervision of less accredited individuals. These less accredited individuals are qualified to conduct the basic tests (based on the requirements of the particular country, region, or aircraft overseeing authority) but are not qualified or accredited for the setup and calibration of the test equipment and the acceptance or rejection of the tested part.

When an aircraft lands on a runway, tremendous forces are applied to the aircraft tire, held by the two wheel halves (held together by tie bolts), which then exerts sideways pressure on each of the two wheel halves. Circumferential cracks in tie bolts can cause them to fail under such pressure and cause the separation of the two wheel halves, and deflation and shredding of the tire, with potentially catastrophic consequences to the aircraft.

Aircraft regulatory organizations such as the United States' Federal Aviation Administration (FAA), and analogous regulatory bodies, as well as others, require that such tie bolts be examined on a regular basis for the presence of circumferential cracks by means of NDT methods in specific areas of each tie bolt by accredited individuals certified to accepted accreditation by organizations such as the American Society for Non-Destructive Testing, SNT-TC-1A, Military Standard, MIL-STD-410E, Aerospace Industries Association, National Aerospace Standard-410, AIA-NAS-410, as well as others.

Individuals can be certified to three levels of accredited expertise, level I, II and III. An operator certified to level I can perform Non-Destructive Testing using methods and equipment selected and calibrated by a level II or level III certified operator, but is not accredited to accept or reject a tested part. Since there are much fewer certified level II and level III operators they are usually not available in sufficient numbers and receive much higher wages than level I operators.

The NDT of tie bolts for circumferential cracks is presently performed using one of three methods of NDT, magnetic particle (MT), eddy current (ET), and ultrasonic (UT), as may be selected by a level II or level III certified operator.

The method and equipment selected has to be set up and calibrated by either the level II or the level III operator who chose that method, each time a different tie bolt, or set of tie bolts, is to be tested on the selected equipment.

Since certification by any recognized organization does not accredit a level I operator to accept a tested bolt for further use on an aircraft, a level II or a level III operator is required to oversee the testing by a level I operator and to accept or reject the tested bolt, in response to the test results. However, the more generally accepted industry practice is that not only the calibration, but also the actual testing of a tie bolt is performed by a level II or level III certified operator.

For each of the three NDT methods of testing, the calibration and set up of, and the actual testing with the testing equipment presently in use, is very time consuming and therefore very costly, especially when performed by a level II or III operator. These methods are commonly performed in a mostly manual manner, and are, thus, also relatively prone to interpretation errors by these operators.

The MP testing method is generally used more frequently than the other presently used NDT methods. It can be used only to test tie bolts made of ferro magnetic metal, while the proposed testing system can test tie bolts made of any metal. This Magnetic Particle testing method needs the deposition of ferrous particles suspended in a liquid carrier on the tie bolt surface in order to make a crack in the tie bolt surface visible to the operator. This coating, or residue, has to be removed before the tie bolt can be used on a wheel again. The removal of this residue requires cleansing, usually done by submersion of the tie bolt in a specific liquid which can dissolve the often oily residue base. After the immersion the tie bolt has to be dried. This cleansing and drying procedure adds valuable time to this Magnetic Particle testing method, and requires the acquisition of accessory components to perform this cleaning and drying. Additional time and facilities are required for the waste disposal of the particles, the carrier and the cleaning solution.

Known systems require extensive pre-testing cleaning of parts, so as to remove all surface contaminations. This commonly includes brushing between the bolt threads, etc., prior to testing using Eddy Current and Magnetic Particle testing methods. Poor or improperly cleaned parts can lead to false rejections of parts eligible for use or, more importantly, failures to identify cracked or otherwise deficient parts.

Furthermore, each tie bolt has to be cleaned thoroughly, usually by brushing, between its thread, for at least two of present testing methods, the Eddy Current and the Magnetic Particle. The proposed testing equipment can test a tie bolt with only a minimum of surface cleaning and there is no need to clean between the tie bolt threads, thus eliminating the need for time, equipment and cleaning implements.

Further, these Magnetic Particle based testing types of systems leave a residue of ferrous particles, suspended in a liquid carrier, on the surface of the part. This residue must be removed, necessitating a time consuming cleaning method employing a liquid/mechanical means of cleaning and drying of the part. In addition, the particles, carrier, and cleaning solution must be disposed of after such processes, and such disposal must be undertaken using acceptable means, which can result in significant expenses.

Known systems using Eddy Current based testing methods employ a probe, specially designed and made for this type of testing, which rests between two adjacent threads by gravity, while the tie bolt is rotating in a motor driven fixture. Some bolts have on them a coating or plating which occasionally peels off in between adjacent threads. This cannot be removed by simple surface cleaning. This deposit may cause the probe to abruptly rise or "jump" when the tie bolt rotates under it. As such systems are aimed at monitoring a preset distance between the probe and the thread, such a bump may register as being indicative of a crack between two adjacent threads and, thus, a false negative result. The Magnetic Particle and Eddy Current methods of inspection only generally inspect for a crack originating from the outer body of the bolt. The crack must propagate from the thread root or the neck near the bolt head. A damaged thread root or a stretched thread may not be detected by these methods. A damaged or stretched thread can lead to crack propagation in the bolt and its failure under load.

Given the costs and time associated with the setup and calibration of present testing systems, there is a need to provide a means of more efficiently setting up and running a tie bolt testing system. There is also a need to provide means of accumulating or analyzing testing data for the purposes of improving the testing system itself, as well as providing data useful in adapting manufactured parts, to address areas of components prone to failure (or weakening to the point of uselessness for the given applications).

BRIEF SUMMARY

There is disclosed herein a method for non-destructive testing of at least one test body, having at least one surface, the method comprising steps of positioning the test body in a test position; transmitting ultrasonic waves, by a transmission device, into the test body at one or more locations on the surface; receiving portions of the ultrasonic waves, by a receiving device, that are reflected from or through the test body at each of the locations; generating, by a wave generating device, at least one test wave form based on the portions corresponding to each of the locations; comparing, by a wave processing device, the test wave form for the body at each of the locations to a respective one of a set of calibration wave forms for a reference body. The calibration wave form is indicative of performance characteristics of a reference body; recording, on a storage device, a result from the comparing, wherein the result is positive if the test body is eligible for use in the industrial application and wherein the result is otherwise negative; and outputting the result by an output device.

In another disclosed aspect the transmission device comprises one or more transducers operatively positioned near one end of the test body and adapted for coupling ultrasonic waves into the test body.

In another disclosed aspect, the test body has a first end and a second end located distal to the first end.

In another disclosed aspect, the positioning includes submerging one end of the test body in a testing pool, wherein the testing pool is filled with water.

In another disclosed aspect, the positioning comprises affixing the test body between a plurality of retaining members.

In another disclosed aspect, the receiving device comprises one or more transducers operatively positioned near one end of the test body.

In another disclosed aspect, the receiving comprises detecting the portions of the ultrasonic waves reflected through, deflected, scattered and, broken in the test body by converting the portions into electronic signals for evaluation.

In another disclosed aspect, the comparing comprises assessing differences and similarities between the test wave form and the calibration wave form to locate any deficiencies in the structure or composition of the test body.

In another disclosed aspect, the test body comprises an aircraft part.

In another disclosed aspect, the test body comprises an aircraft wheel tie bolt.

In another disclosed aspect, the method further comprises recording identifying data related to the test body and the results further comprise the identifying data.

In another disclosed aspect, the method further comprises producing the calibration wave form.

In another disclosed aspect, the method further comprises, after the receiving, determining a signal to noise ratio in respect of the test wave form and repeating the transmitting and the receiving if the ratio is not above a threshold level.

In another disclosed aspect, the test body is positioned in a first orientation and the method further comprises, after the comparing, repositioning or rotating the test body in a second orientation and then performing the transmitting, the receiving and the comparing prior to performing the assessing and the outputting.

There is a system for non-destructive testing of at least one test body having at least one surface. The system includes a plurality of retaining members configured to hold or rotate the test body in various test positions. The system also includes a transmission device, operatively positioned substantially adjacent the test body and adapted to transmit ultrasonic waves therein at one end of the test body on a surface thereof. A receiving device is also provided, operatively positioned adjacent the test body and adapted to receive portions of the ultrasonic waves that are reflected from or through the test body at one end of the test body. In addition, a wave generating device is provided electrically connected to the receiving device and configured to generate at least one test wave form based on the portions corresponding to each of the locations. A wave processing device is also provided in electronic communication with the generating device and adapted to compare the test wave form for the body at each of the locations to a respective one of a set of calibration wave forms for a reference body. The calibration wave form is indicative of performance characteristics of a reference body. The processing device generates a result which is positive if the test body is eligible for use in an industrial process and otherwise negative. A storage device is provided in electronic communication with the processing device for storing the result, and an output device for outputting the result.

In another disclosed aspect, the transmission device comprises one or more transducers operatively positioned near one end of the test body and adapted for coupling ultrasonic waves into the test body.

In another disclosed aspect, the test body has a first end and a second end located distal to the first end, and wherein the one or more locations comprise a plurality of locations spaced substantially evenly about the surface of the first end.

In another disclosed aspect, the system further comprises a testing pool and the retaining members hold one end of the test body therein.

In another disclosed aspect, the testing pool is filled with water so as to partially immerse the test body therein.

In another disclosed aspect, the receiving device comprises one or more transducers operatively positioned substantially in line with the test body.

In another disclosed aspect, the receiving device(s) and the transmission device(s) comprise one or more transducers operatively positioned near one end of the test body.

In another disclosed aspect, the test body is positionable in the retaining members in at least a first orientation and maybe moved or rotated through other orientations.

In related aspects, a computing apparatus may be provided for performing aspects of the methods summarized above. An apparatus may include, for example, a processor coupled to a memory, wherein the memory holds instructions for execution by the processor to cause the apparatus to perform some of the operations as described above. Certain aspects of such apparatus (e.g., hardware aspects) may be exemplified by equipment such as computer servers, personal computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform aspects of the methods as summarized above.

BRIEF DESCRIPTION OF THE DRAWINGS

Embodiments are illustrated by way of example in the accompanying figures, in which like reference numbers indicate similar parts or method steps, and in which:

FIG. 2 is a flow chart depicting the steps in a method illustrative of those disclosed herein; and, FIG. 3 is an enlarged view of the test body 202, shown in FIG. 1.

DETAILED DESCRIPTION

While the making and using of various embodiments of the present disclosure are discussed in detail below, it should be appreciated that the present disclosure may be embodied in a wide variety of specific contexts. The specific embodiments discussed herein are merely illustrative of specific ways to make and use the disclosure and do not limit the scope of the disclosure.

To facilitate the understanding of this disclosure, a number of terms are defined below. Terms defined herein have meanings as commonly understood by a person of ordinary skill in the areas relevant to the present disclosure. Terms such as "a", "an", and "the" are not intended to refer to only a singular entity, but include the general class of which a specific example may be used for illustration. The terminology herein is used to describe specific embodiments of the disclosure, but their usage does not limit the disclosure, except as outlined in the claims.

Figure 1:
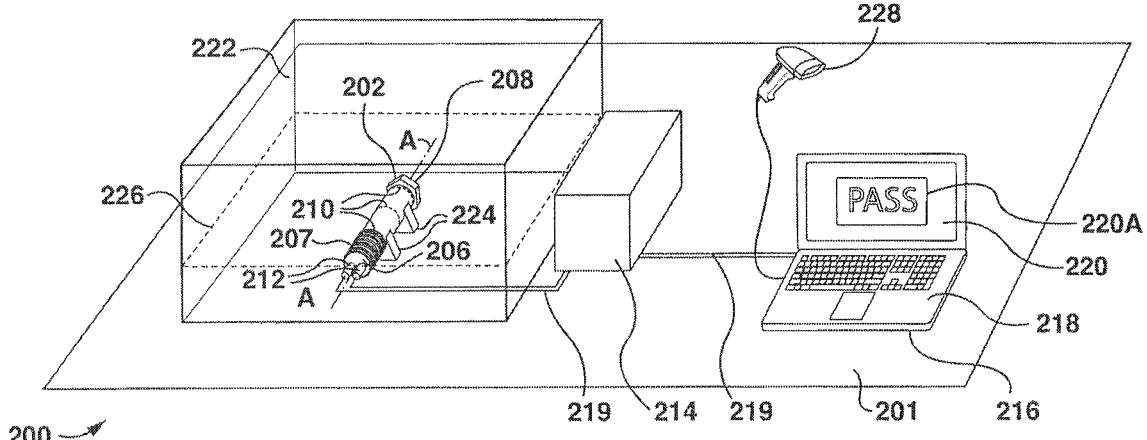
FIG. 1 is a perspective view illustrating a system illustrative of those herein disclosed.

The disclosed system 200, shown in FIG. 1, can be operated by a person without the level II and/or III qualifications discussed above, without any significant reduction in the efficacy of the inspection. This is because, while the operator (not shown) of the system 200 does not make the decision to accept or reject a particular part 202, the system 200 itself will have been calibrated by a level II or III inspector. In this regard, it is in effect the system 200 that evaluates and makes the decision regarding the eligibility of the part 202 for use, thereby minimizing odds of human error.

There is provided herein systems 200 and methods 100 for non-destructive testing of at least one test body or part 202 having at least one surface, such as exposed end 206 (see FIG. 1; although the other end 208 could be scanned, depending on part geometry). By way of introductory summary, and looking to FIG. 2, the method 100 comprises steps of: 102: positioning the test body 202 in the test position; 104: transmitting ultrasonic waves, by a transmission device 212, into the test body 202 at one or more locations (shown as 206a and 206b in FIG. 3) on the first end 206 of the test body 202; 106: receiving portions of the ultrasonic waves, by a receiving device 212, that are reflected from or through the test body 202 at one of the locations 206a, 206b; 108: generating, by a wave generating device 214, at least one test wave form based on the portions corresponding to one of the locations at the first end 206 of the test body; 110: comparing, by a wave processing device 216, the test wave form for the body 202 at the location at one end 206 of the test body to a respective one of a set of calibration wave forms for a reference body (not explicitly shown but in the shown embodiment, of the same size, shape, appearance and composition as the test body 202); wherein the calibration wave form is indicative of performance characteristics of the reference body; 112: recording, on a storage device 218, a result from the comparing, wherein the result is positive if the test body 202 is eligible for use in the industrial application (e.g., as a tie bolt in an aircraft wheel) and wherein the result is otherwise negative; and, 114: outputting the result by an output device 220.

Figure 3:
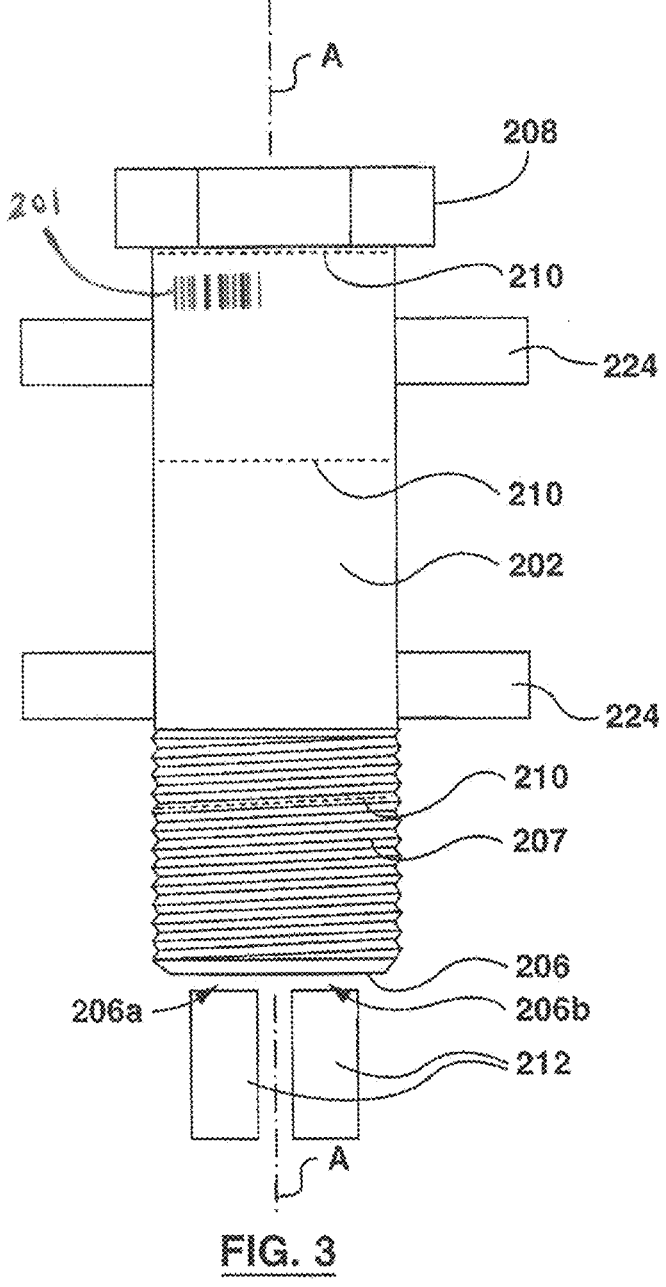

In some embodiments, the test body 202 may preferably be an aircraft part and, more preferably, a tie bolt 202 (as shown in FIGS. 1 and 3) such as those used to affix halves of an aircraft wheel (not shown) to one another. The test body 202 may have the first end 206 and the second end 208 located distal to the first end 206. Depending on its geometry, the test body 202 may have multiple surfaces. While this does not impact the overall working of the system 200 or implementation of the method 100, it may impact the numbers and orientations of various components, as discussed in more detail below.

A testing pool 222 may be provided (shown as transparent in FIG. 1, for ease of illustration), and the test body 202 may be partially immersed therein when the testing pool 222 is filled with water 226 (shown notionally in FIG. 1) to a degree sufficient to partially immerse the test body 202. This may facilitate the use of certain ultrasound analysis techniques and may impact the positioning of the transducer elements 212 discussed herein, relative to the test body 202. A plurality of retaining members 224 (which may form part of a unitary structure) are provided for holding, moving or rotating the test body 202 in the testing position (for example, the orientation shown in FIG. 1, wherein the body 202 is operatively positioned for testing in the manner herein described).

In some instances, the test body 202 may be repositioned in different orientations (not explicitly shown but understood to be, for example, moving the test body along or rotating it about the axis A-A, also shown in FIG. 3)) and the transmitting, the receiving and the comparing functions performed. Factors affecting whether or not this step is taken will include the geometry of the body 202. In this regard, it is noted that the body 202 is shown as having a hexagonal head at its second end 208; however, other head geometries may also be used). Turning back to the orientation of the body 202, for example, moving or rotation may be needed to provide suitable access to the locations (e.g., 206a and 206b) of particular interest in a given application. The repositioning may be more reactive and automated in nature in some embodiments, with the test body 202 and/or the transmission and receiving devices (shown in the figures as both being the transducers 212, as herein described) moving in a programmed or operator selected pattern (with the movement continuing until a sufficient number of locations 206a, 206b on the end 206 of the test body 202 had been reviewed as to conclude the suitability of the body 202 for use in the given industrial application (e.g., as a tie bolt in use, holding together aircraft wheel halves).

As noted above, the transmission device 212 may be one or more transducers 212, which will be operatively positioned near one end, e.g., the first end 206 of the test body 202 and adapted for coupling ultrasonic waves into the test body 202. Precise frequencies of the ultrasonic waves transmitted into the test body 202 may vary. Factors affecting a choice of frequency may include the thickness of the body 202 to be tested, its structure, and the material(s) of which it is made. Further, different frequencies may be preferable in embodiments where the test body 202 is partially immersed during testing. In addition, particular features, e.g., geometry, etc., of the transducers 212 employed in a specific embodiment may also affect this choice.

The receiving device 212 may also consist of or include one or more transducers 212. In some embodiments, and as shown in FIG. 1, the same transducers 212 may serve as both transmitters and receivers.

These transducers 212 may be operatively positioned at one end, e.g., the first end 206 of the test body 212, substantially in line therewith, and at a distance there from necessary to function in the manner herein described. Further, the transmission 212 and receiving devices 212 may be provided on mobile, automated arms (not shown) adapted to move in accordance with manually input or preprogrammed commands, through a scanning routine whereby a sufficient number of the locations 206 a 206b in the test body 202 are scanned to enable a determination as to the result of the test body 202. If provided in an array or phased array arrangement, the transmitters and receivers may similarly be provided in such an arrangement at one end 206 of the test body 202.

The receivers 212 detect the portions of the ultrasonic waves reflected through, deflected, scattered and/or broken in the test body 202 by converting the portions into electronic signals for evaluation. Different signal performance is indicative of different characteristics of the test body 202. For example, certain spikes in the signal would be indicative of the presence of a circumferential crack 210, whereas others would be indicative of a gouge or a tear.

Signal generating devices 214 such as various ones well known in the art may be employed in embodiments 200 herein disclosed.

A wave processing device 216 will be provided in electronic communication with the transducers 212. The disclosed system 200 stores the test result of a given body 202 and correlates this result to a part identifier (e.g., a UV label or marker or other writing is in some instances provided on the part 202 itself; etching and similar marking methods are typically avoided as such practices may impact the structural integrity of the part). Identifying data related to the test body 202, correlated with the results, may also be recorded and comprise part of the overall result. The identifying data may include, for example and without limitation, a date of the test, a location at which the test was conducted, a name of an individual conducting the calibration (including applicable professional registration numbers or designators, as applicable), including the size and location of any monitored discontinuities or other defects, the manufacturer of the part, its intended user, its past users. This data may be catalogued and indexed by way of bar code 201 or other machine readable code affixed to the bolt 202.

These test results will be stored in the system's computer memory 218, for archiving or reference purposes by the testing service or by the wheel tie bolt owner. Hard copies of these results can also be made available by the system 200 (either through a printer integral to or connected with the system 200 or via data output in a manner suitable for later printing). The constituent elements and nature of presentation of the data made available for printing may be customized so as to meet any requirements of the party to whom the hard copies may be delivered via a communications device (e.g., via a wired or wireless network, or other wired or wireless electronically communicative connection) and adapted to compare the test wave form for the test body at each of the locations to a respective one of a set of calibration wave forms for a reference test body.

Assessing differences and similarities between the test wave form and the calibration wave form will yield valuable information indicative of the size(s), location(s) and nature(s) of any deficiencies in the structure or composition of the test body 202.

Since a human operator (not shown) does not make the decision to "accept" or "reject" the tested tie bolt s/he does not require to be certified to any advanced level of accreditation. Between this reduced expense and the limited time required for calibration, and given increases in tie bolt testing speed, there are substantial savings available through use of systems 200 disclosed herein.

Further, as acceptance or rejection of each tested tie bolt 202 for use is not dependent on an operator but rather on a properly calibrated and operating system 200, its result is much more reliable than in systems heavily or totally reliant upon human observation and judgment.

The calibration of the disclosed systems 200 needs to be performed only once for each different type of tie bolt 202. Once this calibration has been completed by a level II or level III operator it is stored in the memory 218 of the processor 216 (e.g., the memory may be that of a laptop or other computer which may also include the processor) of the disclosed system 200 (or, for example, in an accessible database, network, or cloud storage system). When the calibration is completed for all of the different types of tie bolts 202 in use by the owner of the disclosed system 200 and the aircraft on which the tie bolts 202 are used or to be used, the level II or level III operator need not attend to the test equipment again. To test each different tie bolt 202 the operator (not shown) of the testing system 200 simply calls up the stored testing information or the operator reads the bar code on the tie bolt 202 into the computer 216 (e.g., by way of scanning a barcode or other product identifier) which then automatically recalls the test data for the tie bolt 202 to be tested.

The method 100 may also include producing the calibration wave form. This may be accomplished, for example, by performing steps analogous to the transmitting 104, receiving 106 and generating 108 on the calibration body (not shown), wherein the calibration body is known to exhibit no impermissible performance properties (or has ones of known size(s), location(s) and nature(s)).

In contrast to the 5 to 6 minute inspection times common in the field, once calibration is completed (which process itself may take on the order of 20 to 30 minutes), disclosed systems accomplish testing in on the order of 15 seconds or less per tie bolt 202. An operator is in some embodiments present during testing, and to place and remove tie bolt 202 and to take whatever next action with the tie bolt 202 is dictated by the testing result; however, these placement aspects may in some embodiments be accomplished on an automated basis (e.g., where tie bolts 202 may be tested in large batches).

Steps may also be taken to determine a signal to noise ratio in respect of the test wave form and repeating the transmitting and the receiving if the ratio is not above a threshold level. The threshold level may be determined on a case by case basis by Level II or Level III qualified personnel.

Looking next to storage aspects of the system 200, it should be noted that airlines usually possess many aircraft wheels, some in use on their aircraft and some held as spares or back-ups (so as to avoid undue maintenance delays, etc.). Very precise records of the number and location, etc. of these wheels are kept, for logistical purposes. A desire of airlines is to be able to keep track of new tie bolts, and those tested and accepted for re-use. The presently used testing equipment cannot provide a record of the accepted and/or rejected tie bolts, except in a lengthy time consuming hand written/typed one by the level II or III operator.

In contrast with known systems which do not provide for recordal or storage of test results, systems and methods disclosed herein provide for result recordal and storage. Further, the various identifying characteristics collected, documented and available for cross-referencing allow tie bolt 202 use tracing (e.g., revealing use on previous and later wheels from perusal of a given test result).

In the disclosed systems the test results are stored in computer memory devices 218 and can also be printed out on, for example, an included hard copy printer (not shown) or forwarded in electronic form. As discussed briefly above, with an included bar code reader 228 the bar code on each tie bolt 202 may be read to identify the bolt and stored in computer memory 218, together with the stored test results. The disclosed ultrasonic testing system 200 provides a means by which each tie bolt 202 can be traced through its use on consecutive wheels and aircraft.

One exemplary output is by way of a colour screen display 220 with a direct readout indicative to the operator that a given (e.g., shown in FIG. 1 as "PASS"), tested tie bolt 202 is acceptable to be used in an aircraft, or rejected for the presence of circumferential cracks or other deficiencies in the tie bolt 202. For example, by way of prominently displaying the word, "PASS" 220A, in bold, green letters (so the tie bolt 202 can be reused on an aircraft wheel), or "FAIL" in bold, red letters (if the tie bolt 202 cannot be reused on an aircraft wheel).

The disclosed system 200 substantially eliminates the need for human interpretation of the test results, ensuring enhanced repeatability and reliability of the test, in terms of correctly identifying parts that should or should not be used.

Even if provided as a third party service, systems herein disclosed could be more competitively priced without any loss of quality.

Unlike various other testing methods the ultrasonic testing methods herein disclosed do not require extensive cleaning of the tie bolt 202 prior to testing. Instead, a cursory wiping of the tie bolt 202 is generally sufficient. The disclosed testing system can test tie bolts made of any presently used metals and does not leave a residue or coating on the tie bolt 202 surface which has to be removed. Separate calibrations are conducted for tie bolts 202 made of different metals, and their identifying information will typically include their material.

In contrast with the deficiencies of, for example, eddy current systems, as discussed herein, performance of the disclosed system 200 is not affected by a plating deposit between threads 207, in that there will be no resultant false negative results. Instead, and if otherwise meeting performance requirements, such tie bolts will be deemed acceptable for further use on aircraft wheels if meeting performance standards after the plating has been taken care of. The disclosed system 200 inspects along the entire length of the tie bolt. Threads 207 that have root damage or have been stretched can be detected.

Calibration processes may include determining those of the locations 206a, 206b (or others, including the position along the length of the bolt 202) most likely to be under the highest loads/stress and most susceptible of failure. This determination itself could be guided by data accumulated via use of the disclosed systems 200.

The assessment may include cumulative consideration of all signals so as to draw conclusions about the ultrasonic transmission properties and reflection properties in the entire test body. This enables more complete testing and more accurate determination of eligibility of the test body 202 for use. The integration of processing components allows for more quickly assessing any errors in the testing process, avoiding wasted testing and calibration time. The integrated system 200 also facilitates maintenance of records of failure types, and locations in respect of certain part geometries and materials.

The accumulation and analysis of large volumes of data allows for ease of operation by persons less sophisticated, or at least less highly accredited, than has previously been possible with testing systems employed in the area of aircraft parts, without sacrificing, and perhaps improving, the quality of test results Analytics of the process may be considered by way of reviewing data relating to a large volume of testing results so as to determine if measures may be taken to increase testing efficiencies or effectiveness. Potential variables for consideration and correlation include, without limitation, dates and times of testing, product source manufacturers, product users, airport locations, and the like, as well as the one of the locations whereon the tie bolt 202 deficient element was noticed. This data may serve as a guide to manufacturers regarding any improvements that maybe made in terms of design or manufacturing of tie bolts 202. While certain constraints may be in place with respect to the geometry of wheels to be held together with tie bolts 202 (e.g., length, diameter, geometry of interface between bolt shaft and head).

Disclosed systems 200 may also include a substantially unitary housing (not shown) encasing and protecting the other components from environmental factors. Such factors may include, for example, heat, humidity, dust, and electrical interference Various embodiments of systems and methods according to the present disclosure are described. It is to be understood, however, that the following explanation is merely exemplary. Accordingly, several modifications, changes and substitutions are contemplated.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided as organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps. Methods herein described are exemplary, and performance is intended by software (e.g., stored in memory and/or executed on hardware), hardware, or a combination thereof. Hardware modules may include, for example, a general-purpose processor, and/or analogous equipment. Software modules (executed on hardware) may be expressed in a variety of coded software languages comprising object-oriented, procedural, or other programming language and development tools.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to storage media and hardware devices that are specially configured to store and execute program code.

All of the systems and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

The invention claimed is:

1. A method for non-destructive testing of at least one test body, the method comprising steps of:

positioning the test body in a test position wherein a bar code on the test body is configured for identifying the test body;

wherein the positioning comprises affixing the test body between a plurality of retaining members;

wherein the test body is in the test position and partially immersed in a testing pool filled with water;

wherein the test body has at least one surface located at a first end thereof;

transmitting ultrasonic waves, by a transmission device, into the test body at one or more locations on the surface;

receiving portions of the ultrasonic waves, by a receiving device, that are reflected from or through the test body at the first end;

generating, by a wave generating device, at least one test wave form based on the portions corresponding to each of the locations;

comparing, by a wave processing device, the test wave form for the test body at each of the locations to a respective one of a set of calibration wave forms for a reference body;

wherein the calibration wave form is indicative of characteristics of the reference body;

recording, on a storage device, a result from the comparing, wherein the result is positive if the test body is eligible for use in an application and wherein the result is otherwise negative;

outputting the result by an output device.

2. The method according to claim 1, wherein the transmission device comprises one or more transducers operatively positioned at the first end of the test body and adapted for coupling ultrasonic waves into the test body.

3. The method according to claim 2, wherein the test body has a second end located distal to the first end, and wherein the one or more locations comprise a plurality of locations spaced evenly around the first end of the test body.

4. The method according to claim 3, wherein the receiving comprises detecting the portions of the ultrasonic waves reflected through, deflected, scattered and, broken in the test body by converting the portions into electronic signals for evaluation.

5. The method according to claim 4, wherein the comparing comprises assessing differences and similarities between the test wave form and the calibration wave form to locate any deficiencies in the structure or composition of the test body.

6. The method according to claim 5, wherein the test body comprises an aircraft part.

7. The method according to claim 6, wherein the test body is configured for use on an aircraft wheel.

8. The method according to claim 1, wherein the method further comprises producing the calibration wave form.

9. A method according to claim 8, wherein the method further comprises, after the receiving, determining a signal to noise ratio in respect of the test wave form and repeating the transmitting and the receiving if the ratio is not above a threshold level.

10. The method according to claim 9, wherein the test body is positioned in a first orientation and the method further comprises, after the comparing, repositioning the test body in a second orientation and then performing the transmitting, the receiving and the comparing prior to performing the assessing and the outputting.

* * * * *